United States Patent
Toba et al.

(10) Patent No.: US 10,992,727 B2
(45) Date of Patent: Apr. 27, 2021

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventors: Kazuaki Toba, Kanagawa (JP); Gen Ichimura, Tokyo (JP); Satoshi Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 227 days.

(21) Appl. No.: 15/563,391

(22) PCT Filed: Apr. 4, 2016

(86) PCT No.: PCT/JP2016/060988
§ 371 (c)(1),
(2) Date: Sep. 29, 2017

(87) PCT Pub. No.: WO2016/163329
PCT Pub. Date: Oct. 13, 2016

(65) Prior Publication Data
US 2018/0091575 A1 Mar. 29, 2018

(30) Foreign Application Priority Data
Apr. 8, 2015 (JP) .............................. JP2015-078974

(51) Int. Cl.
*H04L 29/06* (2006.01)
*G09G 5/00* (2006.01)
(Continued)

(52) U.S. Cl.
CPC ............. *H04L 65/607* (2013.01); *G09G 5/00* (2013.01); *G09G 5/006* (2013.01);
(Continued)

(58) Field of Classification Search
CPC ......... H04L 65/60; H04N 21/00; H04N 21/20
(Continued)

(56) References Cited

U.S. PATENT DOCUMENTS 8,804,971 B1 * 8/2014 Williams .............. G10L 19/008
381/23
8,888,592 B1 * 11/2014 Pereira ................... A63F 13/00
463/35
(Continued)

FOREIGN PATENT DOCUMENTS

EP         1130923 A2    9/2001
JP      2001-245268 A    9/2001
(Continued)

OTHER PUBLICATIONS

International Search Report and Written Opinion of PCT Application No. PCT/JP2016/060988, dated Jun. 14, 2016, 08 pages of ISRWO.

*Primary Examiner* — Mahran Y Abu Roumi
(74) *Attorney, Agent, or Firm* — Chip Law Group

(57) ABSTRACT

It is possible to perform favorable content reproduction on a reception side. An encoded stream including a plurality of pieces of encoded data having degree-of-priority information is acquired. Among the plurality of pieces of encoded data, decoding processing is performed with respect to a piece of encoded data having a predetermined or more degree of priority, and a decoded stream including decoded data is generated. Further, among the plurality of pieces of encoded data, an encoded stream including a piece of encoded data having less than the predetermined degree of priority is generated. The decoded stream and the encoded stream are simultaneously transmitted as a partially decoded stream to the reception side via a digital interface.

8 Claims, 11 Drawing Sheets

(51) Int. Cl.
*H04N 21/81* (2011.01)
*H04N 21/845* (2011.01)
*H04N 21/84* (2011.01)
*H04N 21/4363* (2011.01)

(52) U.S. Cl.
CPC ... *H04N 21/43635* (2013.01); *H04N 21/8106* (2013.01); *H04N 21/84* (2013.01); *H04N 21/8456* (2013.01); *G09G 2340/02* (2013.01); *G09G 2370/12* (2013.01)

(58) Field of Classification Search
USPC .......................................................... 709/217
See application file for complete search history.

(56) References Cited

U.S. PATENT DOCUMENTS

| | | | | |
|---|---|---|---|---|
| 8,968,087 | B1* | 3/2015 | Gault | A63F 13/10 463/31 |
| 2001/0017853 | A1* | 8/2001 | Kikuchi | H04N 21/238 370/335 |
| 2007/0091881 | A1* | 4/2007 | Kallio | H04N 21/235 370/389 |
| 2007/0189426 | A1* | 8/2007 | Kim | G10L 19/008 375/343 |
| 2008/0115007 | A1* | 5/2008 | Jalali | H04B 7/18536 714/1 |
| 2009/0279869 | A1* | 11/2009 | Ogawa | G11B 27/034 386/248 |
| 2010/0306813 | A1* | 12/2010 | Perry | A63F 13/10 725/114 |
| 2010/0309287 | A1* | 12/2010 | Rodriguez | H04N 19/597 348/43 |
| 2013/0162680 | A1* | 6/2013 | Perry | G06T 11/00 345/634 |
| 2013/0203501 | A1* | 8/2013 | Pereira | A63F 13/35 463/42 |
| 2014/0111696 | A1* | 4/2014 | Nakajima | G09G 5/003 348/723 |
| 2014/0133683 | A1* | 5/2014 | Robinson | H04S 3/008 381/303 |
| 2014/0327740 | A1* | 11/2014 | Tsukagoshi | H04N 5/4401 348/43 |
| 2014/0355664 | A1* | 12/2014 | Hardy | H04N 19/12 375/240.02 |
| 2015/0373075 | A1* | 12/2015 | Perlman | H04L 65/608 709/217 |

FOREIGN PATENT DOCUMENTS

| | | |
|---|---|---|
| JP | 2008-154045 A | 7/2008 |
| JP | 2013-135454 A | 7/2013 |
| JP | 2014-523190 A | 9/2014 |
| JP | 2015-194666 A | 11/2015 |
| WO | 2015/146057 A1 | 10/2015 |

* cited by examiner

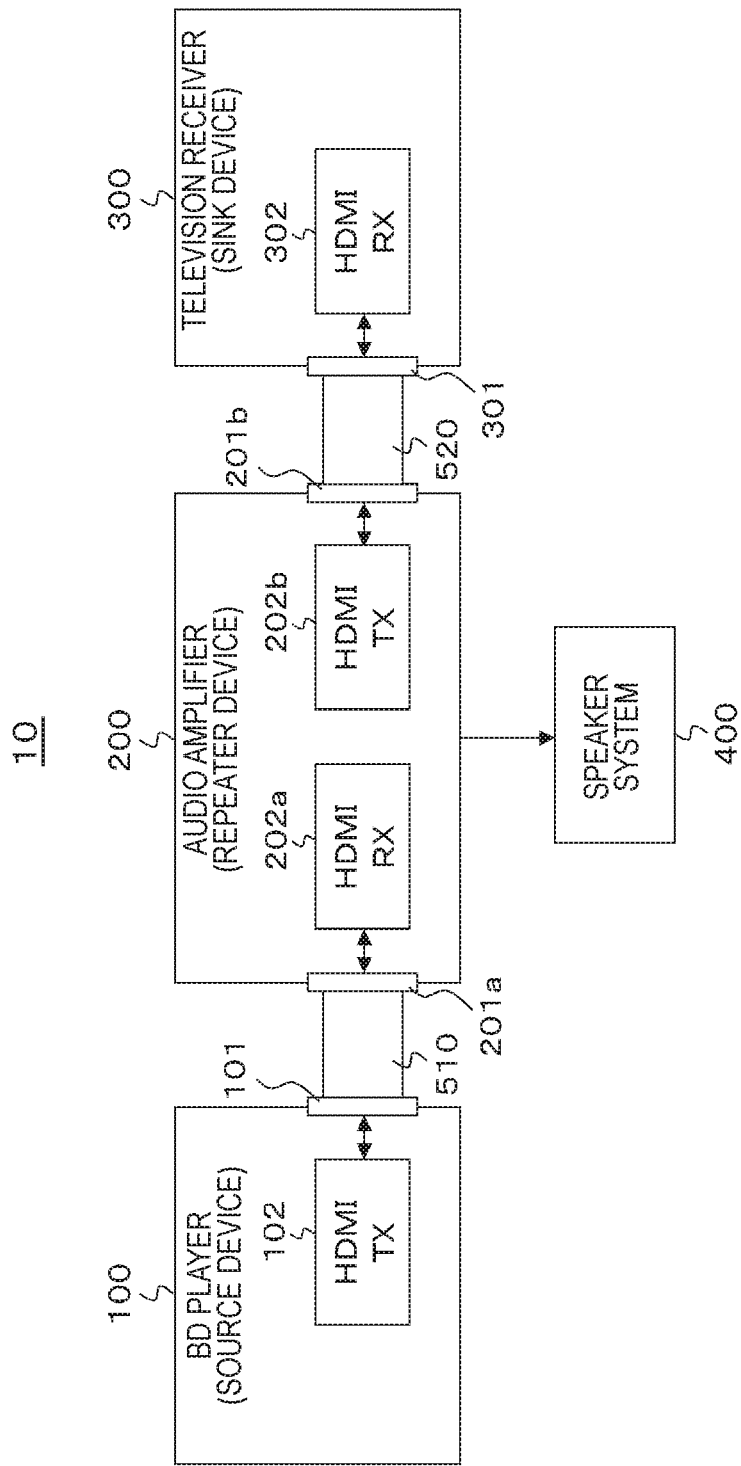

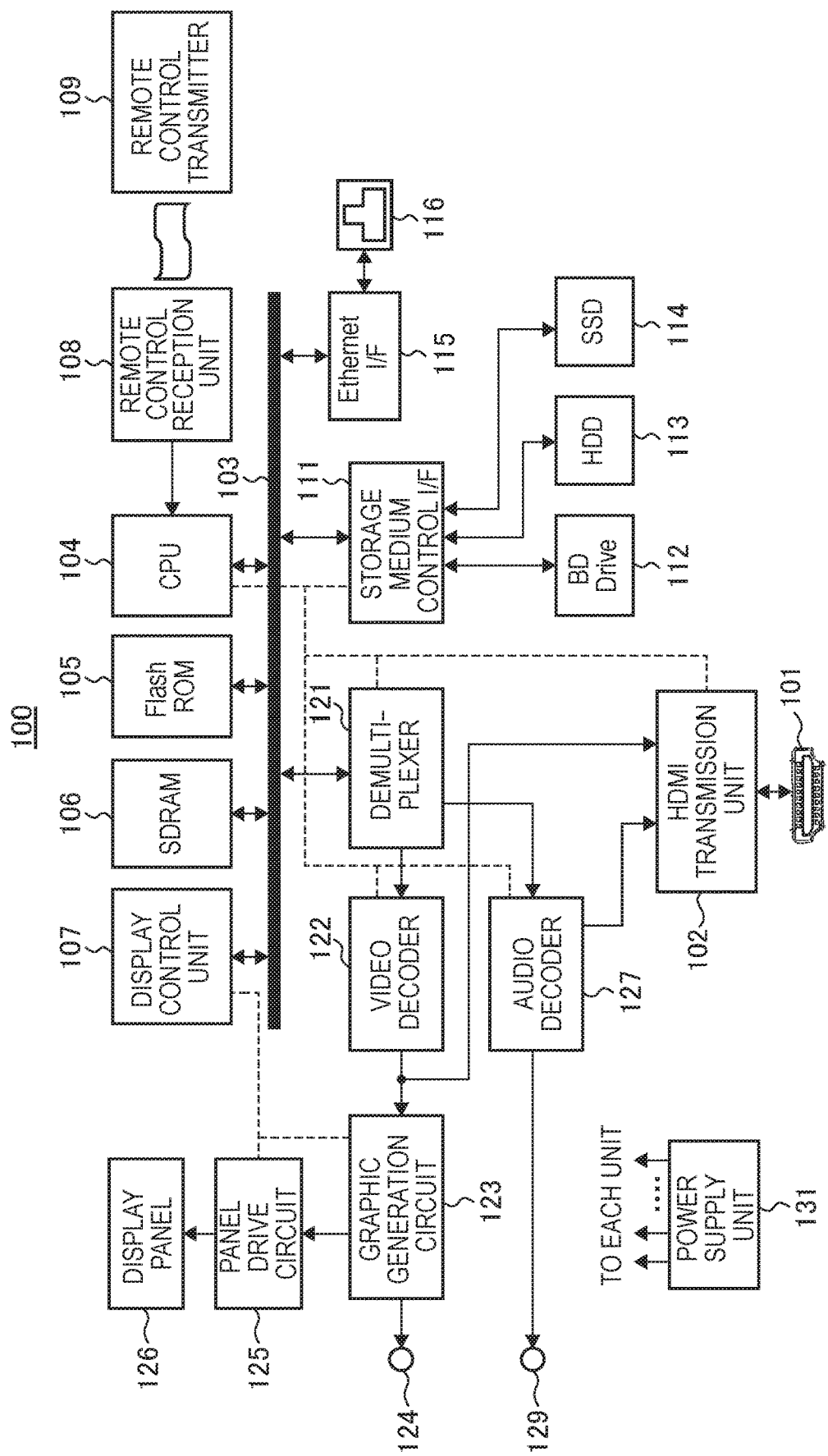

FIG. 3(a)

| 7 | 6 | 5 | 4 | 3 | 2 | 1 | 0 |
|---|---|---|---|---|---|---|---|
| RESERVE | RESERVE | RESERVE | RESERVE | Pri[3] | Pri[2] | Pri[1] | Pri[0] |

FIG. 3(b)

Pri[3:0]
0000: NOT COMPATIBLE WITH DECODING
0001: ONLY DECODING AT DEGREE OF PRIORITY 1 CAN BE PERFORMED
0010: DECODING CAN BE PERFORMED TO DEGREE OF PRIORITY 2
0011: DECODING CAN BE PERFORMED TO DEGREE OF PRIORITY 3
:
0111: DECODING CAN BE PERFORMED TO DEGREE OF PRIORITY 7
1111: RESERVE

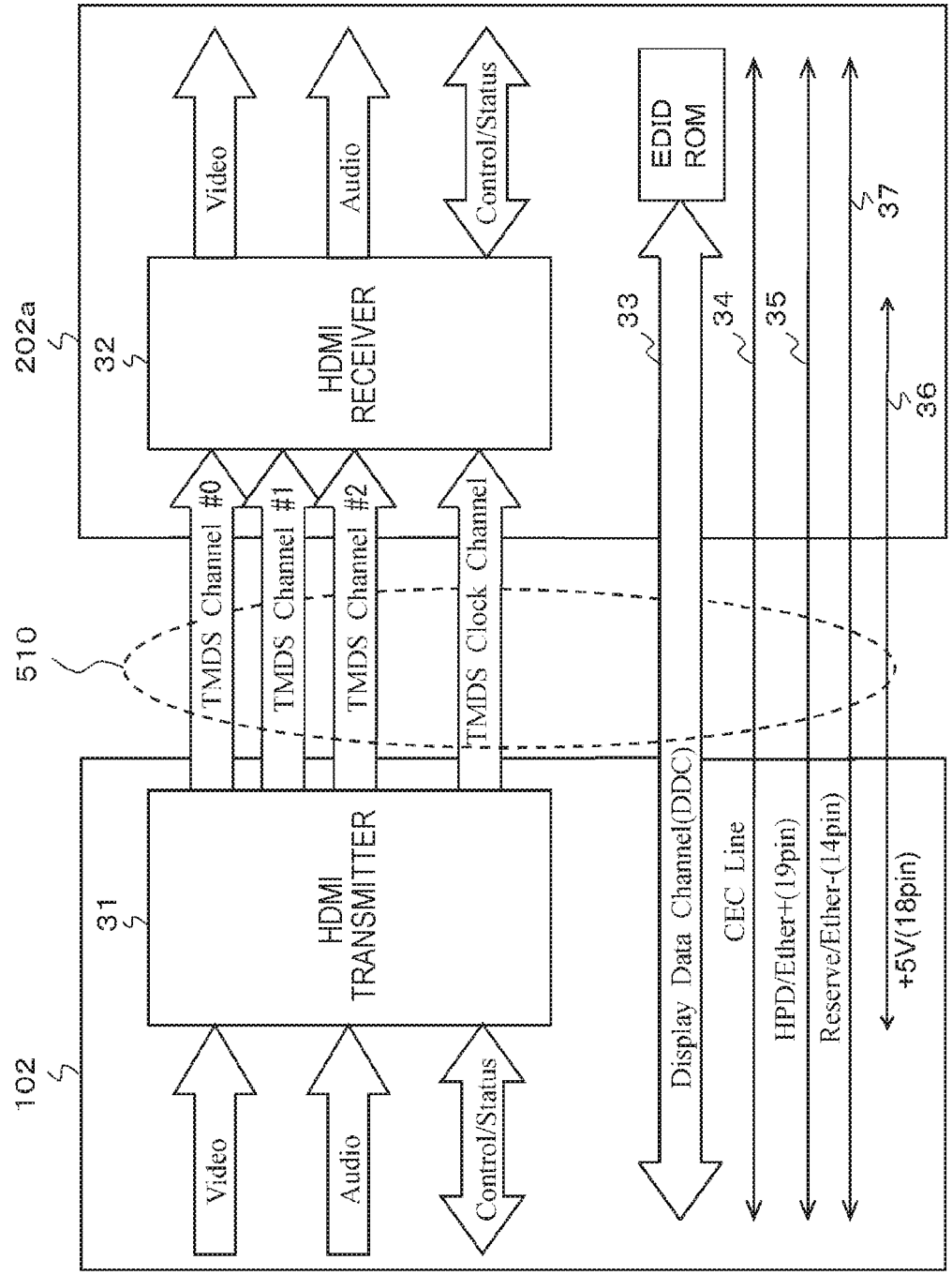

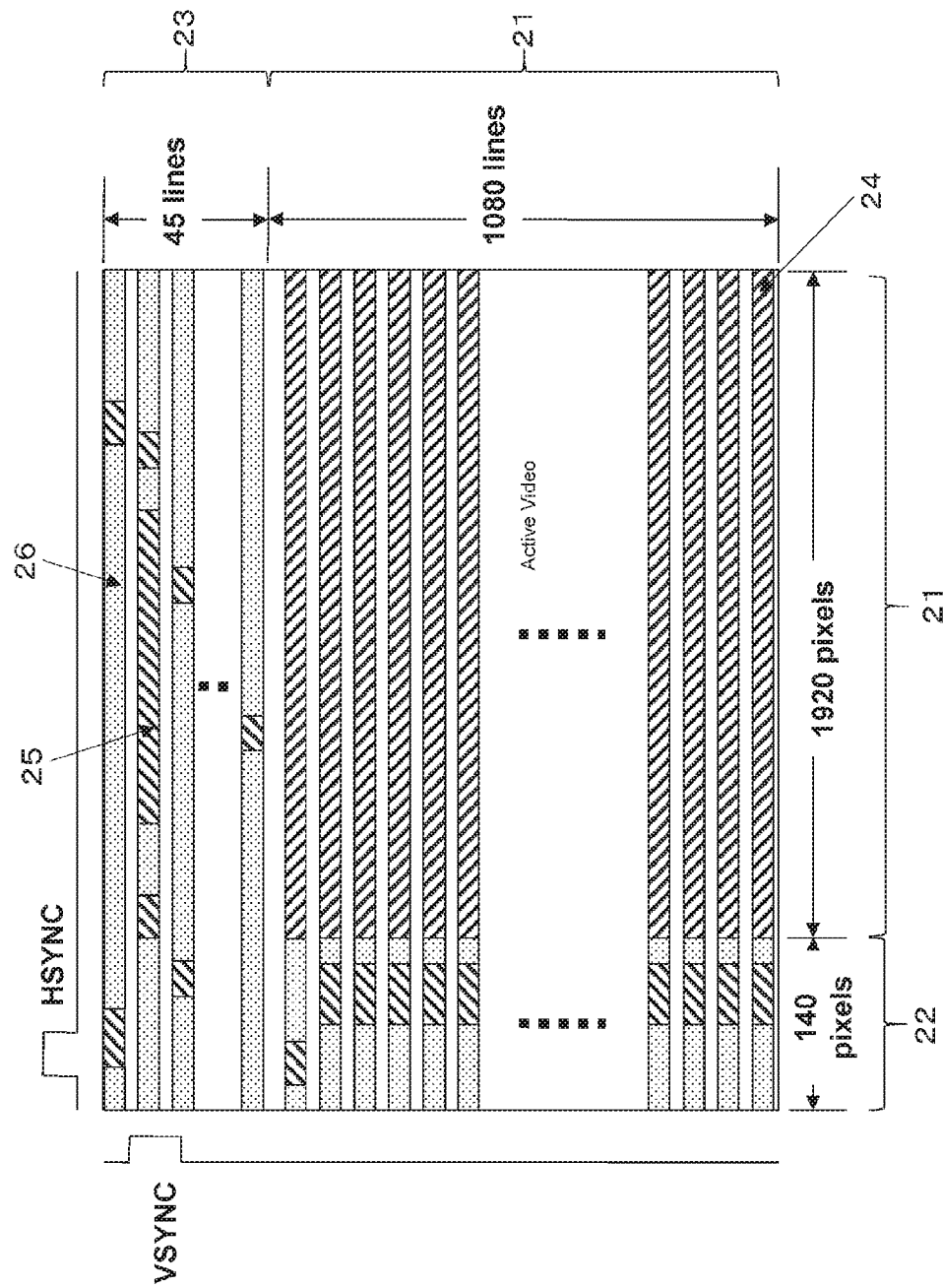

TRANSMISSION APPARATUS, TRANSMISSION METHOD, RECEPTION APPARATUS, AND RECEPTION METHOD

CROSS REFERENCE TO RELATED APPLICATIONS

This application is a U.S. National Phase of International Patent Application No. PCT/JP2016/060988 filed on Apr. 4, 2016, which claims priority benefit of Japanese Patent Application No. JP 2015-078974 filed in the Japan Patent Office on Apr. 8, 2015. Each of the above-referenced applications is hereby incorporated herein by reference in its entirety.

TECHNICAL FIELD

The present disclosure relates to a transmission apparatus, a transmission method, a reception apparatus, and a reception method, and specifically relates to a transmission apparatus and the like for treating a plurality of pieces of encoded data having degree-of-priority information.

BACKGROUND ART

Conventionally, in order to transmit a stream of audio/visual content from a transmission side to a reception side via a digital interface, an encoded stream has been transmitted in a case where the reception side has a decoding ability, and, in a case where the reception side does not have the decoding ability, a decoded stream obtained by decoding in the transmission side has been transmitted.

Further, in a case where both the transmission side and the reception side have a decoding ability, the transmission side determines which performs decoding, or a viewer specifies a side to perform decoding by the viewer's operation. The transmission side cannot know quality of the decoding ability of the reception side, and, also for the viewer, it is extremely difficult to determine which decoding ability is more superior between two devices.

For example, Patent Literature 1 discloses a mixing technology of object-based audio. The object-based audio realizes stereophonic sound by supplying individual object sound sources without mixing the object sound sources and rendering the individual object sound sources on a reproduction device side.

An encoded stream of object-based audio includes encoded data of a plurality of object sound sources. The encoded data of each of the object sound sources is made up of not only sound data but also metadata such as position information on an axis of coordinates. It is considered that the encoded data of each object sound source is caused to have degree-of-priority information indicating a degree of priority at the time of decoding.

CITATION LIST

Patent Literature

Patent Literature 1: JP 2014-523190T

DISCLOSURE OF INVENTION

Technical Problem

The present technology can perform favorable content reproduction on a reception side.

Solution to Problem

A concept of the present technology is a transmission apparatus including: a stream acquisition unit configured to acquire an encoded stream including a plurality of pieces of encoded data having degree-of-priority information; a decoding unit configured to, among the plurality of pieces of encoded data, perform decoding processing with respect to a piece of encoded data having a predetermined or more degree of priority and generate a decoded stream including decoded data and, among the plurality of pieces of encoded data, generate an encoded stream including a piece of encoded data having less than the predetermined degree of priority; and a stream transmission unit configured to simultaneously transmit the decoded stream and the encoded stream generated in the decoding unit as a partially decoded stream to a reception side via a digital interface.

In the present technology, the stream acquisition unit acquires an encoded stream including a plurality of pieces of encoded data having degree-of-priority information. Among the plurality of pieces of encoded data, the decoding unit performs decoding processing with respect to encoded data having a predetermined or more degree of priority and generates a decoded stream including decoded data and, among the plurality of pieces of encoded data, generates an encoded stream including encoded data having less than the predetermined degree of priority.

The stream transmission unit simultaneously transmits the decoded stream and the encoded stream generated in the decoding unit as a partially decoded stream to the reception side via the digital interface. For example, the digital interface may be an HDMI.

For example, a determination unit configured to determine whether or not the reception side is compatible with the partially decoded stream may be further included. In a case where the determination unit determines that the reception side is compatible with the partially decoded stream, the transmission unit transmits the partially decoded stream to the reception side. In this case, it is ensured that the partially decoded stream is transmitted only in a case where the reception side is compatible with the partially decoded stream. In this case, for example, the determination unit may determine that the reception side is compatible with the partially decoded stream on the basis of information indicating that the reception side is compatible with the partially decoded stream, the information being acquired from the reception side.

For example, an information transmission unit configured to transmit information indicating transmission of the partially decoded stream to the reception side via the digital interface may be further included. In this case, on the reception side, it is possible to easily recognize transmission of the partially decoded stream on the basis of this information, and therefore appropriate processing can be performed.

For example, the encoded stream may be an encoded audio stream of an object-based audio including encoded data of a plurality of object sound sources having degree-of-priority information, and among pieces of the encoded data of the plurality of object sound sources, the decoding unit may perform decoding processing with respect to a piece of encoded data of an object sound source having a predetermined or more degree of priority and generate a decoded audio stream including audio data having a predetermined number of channels and, among the pieces of encoded data of the plurality of object sound sources, generate an encoded audio stream including a piece of encoded data of an object sound source having less than the predetermined degree of priority.

In this case, for example, an information acquisition unit configured to acquire speaker configuration information from the reception side via the digital interface may be further included. The decoding unit may generate a decoded audio stream including audio data having the number of channels indicated by the speaker configuration information. In this case, up/down mixing processing for obtaining audio data having the number of channels corresponding to a speaker configuration is not necessary on the reception side, and therefore it is possible to reduce a processing load of the reception side.

As described above, in the present technology, a decoded stream and an encoded stream are simultaneously transmitted as a partially decoded stream to the reception side. Therefore, it is possible to perform favorable content reproduction on the reception side. That is, on a reception side that does not have a decoding circuit, it is possible to perform simple reproduction by using the decoded stream, whereas, on a reception side having a high-quality decoding circuit, it is possible to perform high-quality reproduction by further decoding the encoded stream.

Another concept of the present technology is a reception apparatus including: a stream reception unit configured to receive a partially decoded stream made up of a decoded stream including decoded data and an encoded stream including a predetermined number of pieces of encoded data having degree-of-priority information from a transmission side via a digital interface; a decoding unit configured to obtain decoded data by subjecting the encoded stream to decoding processing; and a combination unit configured to obtain output data by combining the decoded data obtained in the decoding unit and the decoded data included in the decoded stream.

In the present technology, the stream reception unit receives a partially decoded stream made up of a decoded stream including decoded data and an encoded stream including a predetermined number of pieces of encoded data having degree-of-priority information from the transmission side via the digital interface. For example, the encoded stream may be an encoded audio stream of object-based audio including encoded data of a plurality of object sound sources having degree-of-priority information. Further, for example, the digital interface may be an HDMI.

The decoding unit obtains decoded data by subjecting the encoded stream to decoding processing. Then, the combination unit obtains output data by combining the decoded data obtained in the decoding unit and the decoded data included in the received decoded stream.

As described above, in the present technology, the output data is obtained by combining the decoded data included in the received decoded stream and the decoded data obtained by subjecting the received encoded stream to decoding processing, and therefore high-quality reproduction can be performed.

In the present technology, for example, an information transmission unit configured to transmit information indicating that the reception apparatus is compatible with the partially decoded stream to the transmission side via the digital interface may be further included. In this case, it is possible to notify the transmission side of being compatible with a partially decoded stream, and therefore it is possible to actively receive a partially decoded stream from the transmission side.

Further, in the present technology, for example, an information reception unit configured to receive information indicating transmission of the partially decoded stream from the transmission side via the digital interface may be further included. In this case, it is possible to easily recognize transmission of a partially decoded stream, and therefore appropriate processing can be performed.

Advantageous Effects of Invention

According to the present technology, it is possible to perform favorable content reproduction on a reception side. The effects described in the present disclosure are exemplified effects and are not limitative; there may be achieved additional effects.

BRIEF DESCRIPTION OF DRAWINGS

FIG. 1 is a block diagram showing a configuration example of an AV system serving as an embodiment.
FIG. 2 is a block diagram showing a configuration example of a BD player constituting an AV system.
FIGS. 3(a) and (b) are views showing an exemplary structure of decoding ability information of a reception side.
FIG. 10 is a block diagram showing a configuration example of an HDMI transmission unit of a BD player and an HDMI reception unit of an audio amplifier.
FIG. 11 is a view showing periods of various pieces of transmission data in a case where image data having width× height of 1920 pixels×1080 lines is transmitted via TMDS channels.

MODE(S) FOR CARRYING OUT THE INVENTION

Figure 4:
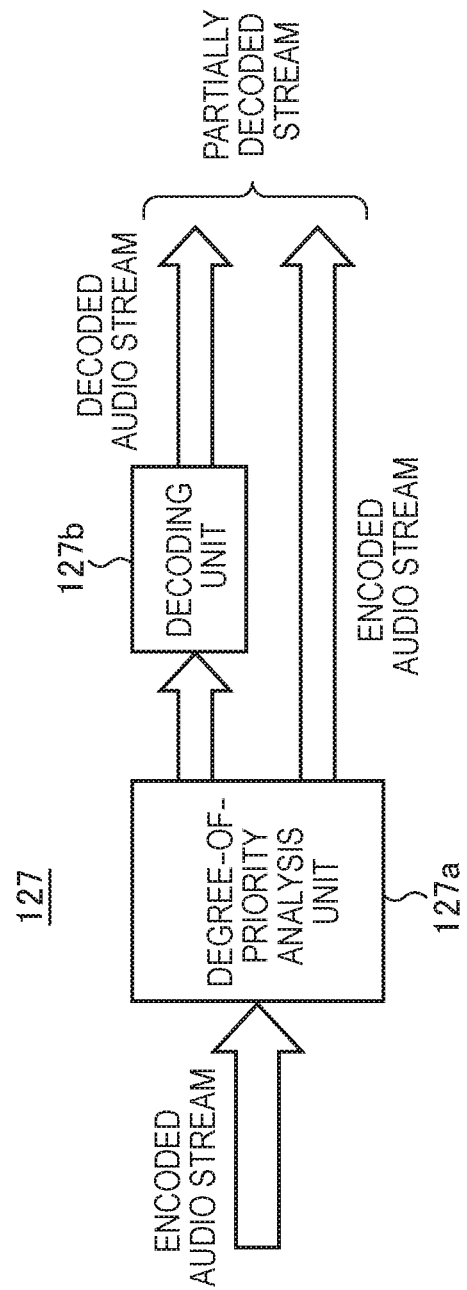
FIG. 4 is a block diagram showing a configuration example of an audio decoder in a BD player.

Hereinafter, an aspect for implementing an invention (hereinafter, referred to as "embodiment") will be described. Note that description will be provided in the following order.
1. Embodiment
2. Modification Example 1. Embodiment

[Configuration Example of AV System]
FIG. 1 shows a configuration example of an audio visual (AV) system 10 serving as an embodiment. This AV system 10 includes a Blu-ray Disc (BD) player 100 serving as a source device, an audio amplifier 200 serving as a repeater device, and a television receiver 300 serving as a sink device. A speaker system 400 for multiple channels is connected to the audio amplifier 200.

Further, the BD player 100 and the audio amplifier 200 are connected through an HDMI cable 510. In the BD player 100, an HDMI terminal 101 to which an HDMI transmission unit (HDNI TX) 102 is connected is provided. In the audio amplifier 200, an HDMI terminal 201a to which an HDMI reception unit (HDMI RX) 202a is connected is provided. One end of the HDMI cable 510 is connected to the HDMI terminal 101 of the BD player 100, and the other end thereof is connected to the HDMI terminal 201a of the audio amplifier 200.

The audio amplifier 200 and the television receiver 300 are connected through an HDMI cable 520. In the audio amplifier 200, an HDMI terminal 201b to which an HDMI transmission unit (HDMI TX) 202b is connected is provided. In the television receiver 100, an HDMI terminal 301 to which an HDMI reception unit (HDMI RX) 302 is connected is provided. One end of the HDMI cable 520 is connected to the HDMI terminal 201b of the audio amplifier 200, and the other end thereof is connected to the HDMI terminal 301 of the television receiver 300. Note that "HDMI" is a registered trademark.

[Configuration Example of BD Player]

FIG. 2 shows a configuration example of the BD player 100. This BD player 100 includes the HDMI terminal 101 and the HDMI transmission unit 102. Further, this BD player 100 includes an internal bus 103, a central processing unit (CPU) 104, a flash read only memory (ROM) 105, a synchronous random access memory (SDRAM) 106, a display control unit 107, a remote control reception unit 108, and a remote control transmitter 109.

Further, the BD player 100 includes a storage (recording) medium control interface 111, a Blu-ray Disc (BD) drive 112, a hard disk drive (HDD) 113, a solid state drive (SSD) 114, an Ethernet interface (Ethernet I/F) 115, and a network terminal 116. Note that "Ethernet" is a registered trademark.

Further, the BD player 100 includes a demultiplexer 121, a video decoder 122, a graphic generation circuit 123, a video output terminal 124, a panel drive circuit 125, a display panel 126, an audio decoder 127, and an audio output terminal 129. Further, the BD player 100 includes a power supply unit 131. The power supply unit 131 supplies power to each unit of the BD player 100. Note that the power supply unit 131 may be an AC power supply or may be a cell (storage cell, dry cell).

The CPU 104, the flash ROM 105, the SDRAM 106, the display control unit 107, the storage medium control interface 111, the Ethernet interface 115, and the demultiplexer 121 are connected to the internal bus 103. The CPU 104 controls operation of each unit of the BD player 100.

The flash ROM 105 stores control software and stores data. The SDRAM 106 forms a work area of the CPU 104. The CPU 104 expands the software and the data read from the flash ROM 105 on the SDRAM 106 and starts the software, thereby controlling each unit of the BD player 100.

The remote control reception unit 108 receives a remo control signal (remote control code) transmitted from the remote control transmitter 109 and supplies the signal to the CPU 104. The CPU 104 controls each unit of the BD player 100 in accordance with the remote control code. Note that, in the present embodiment, a remote control unit is shown as a user instruction input unit. However, the user instruction input unit may be another configuration such as a switch, a wheel, a touch screen unit through which instruction input is performed by an approach/touch, a mouse, a keyboard, a gesture input unit for detecting instruction input by using a camera, or an audio input unit through which instruction input is performed by audio.

The BD drive 112 records content data on a BD disc serving as a disc-like recording medium or reproduces the content data from this BD disc. The HDD 113 records content data or reproduces the content data. The SSD 114 records content data on a semiconductor memory such as a memory card or reproduces the content data from this semiconductor memory.

The BD drive 112, the HDD 113, and the SSD 114 are connected to the internal bus 103 via the storage medium control interface 111. For example, a SATA interface is used as an interface for the BD drive 112 and the HDD 113. Further, for example, a SATA interface or a PCIe interface is used as an interface for the SSD 114.

The network terminal 116 is a terminal connected to a network and is connected to the Ethernet interface 115. The Ethernet interface 115 establishes network connection through the network terminal 116.

The demultiplexer 121 extracts an encoded video stream and an encoded audio stream from a multiplexed stream that is content data reproduced in the BD drive 112, the HDD 113, or the SSD 114. The video decoder 122 performs decoding processing with respect to the encoded video stream, thereby obtaining uncompressed image data.

The graphic generation circuit 123 performs superimposition processing of graphics data and the like with respect to the image data obtained in the video decoder 122 as necessary. The video output terminal 124 outputs the image data output from the graphic generation circuit 123.

The panel drive circuit 125 drives the display panel 126 on the basis of the image data output from the graphic generation circuit 123. The display control unit 107 controls the graphics generation circuit 123 and the panel drive circuit 125, thereby controlling display on the display panel 126. The display panel 126 is configured as, for example, a liquid crystal display (LCD), a plasma display panel (PDP), or an organic electro-luminescence panel.

Note that, although there is described an example where not only the CPU 104 but also the display control unit 107 is provided in the present embodiment, display on the display panel 126 may be directly controlled by the CPU 104. Further, the CPU 104 and the display control unit 107 may be a single chip or may be a plurality of cores.

The audio decoder 127 performs decoding processing with respect to the encoded audio stream extracted in the demultiplexer 121, thereby obtaining uncompressed audio data. In the present embodiment, the encoded audio stream is an encoded audio stream of object-based audio including encoded data of a plurality of object sound sources having degree-of-priority information. The encoded data of each of the object sound sources is made up of not only sound data but also metadata such as position information on an axis of coordinates.

The audio decoder 127 subjects the encoded audio stream to decoding processing, thereby obtaining uncompressed audio data having a predetermined number of channels, and generates and outputs a decoded audio stream including this uncompressed audio data having the predetermined number of channels. In this case, the audio decoder 127 performs decoding processing with respect to encoded data of an object sound source having a predetermined or more degree of priority at which decoding can be performed by the audio decoder 127, and, regarding encoded data of an object sound source having less than the predetermined degree of priority, generates and outputs an encoded audio stream including the encoded data.

The audio decoder 127 outputs the decoded audio stream and the encoded audio stream as a partially decoded audio stream. Note that, in a case where the encoded data of the object sound source having less than the predetermined degree of priority does not exist, the encoded audio stream is not output from the audio decoder 127.

In the present embodiment, in a case where the audio decoder 127 performs decoding processing under control of the CPU 104, the audio decoder 127 obtains uncompressed audio data having the number of channels indicated by speaker configuration information of a reception side. The CPU 104 receives the speaker configuration information from the reception side via a digital interface of an HDMI. For example, on the reception side, the speaker configuration information is recorded as a piece of extended display identification data (EDID). The CPU 104 reads the EDID via a display data channel (DDC) channel, thereby acquiring the speaker configuration information of the reception side. Further, for example, the CPU 104 communicates with the reception side through a CEC line, thereby acquiring the speaker configuration information of the reception side.

Further, in the present embodiment, the CPU 104 acquires decoding ability information of the reception side, that is, information indicating to what number of degree of priority the reception side, i.e., the audio amplifier 200 in the present embodiment, can perform decoding from the reception side via the digital interface of the HDMI. In a case where a decoding ability of the reception side does not exceed a decoding ability of the own side, under control of the CPU 104, the audio decoder 127 may not output an encoded audio stream including encoded data of an object sound source having less than a predetermined degree of priority at which decoding can be performed by the own side.

FIGS. 3(*a*) and (*b*) show an exemplary structure of the decoding ability information of the reception side. Although, as shown in FIG. 3(*a*), this decoding ability information is 8-bit information as a whole, low-order 4 bits from a third bit to a zeroth bit constitute substantial information, as shown in FIG. 3(*b*). For example, "0000" shows that the reception side is not compatible with decoding of an encoded audio stream of object-based audio.

Further, for example, "0001" shows that only decoding at a degree of priority 1 can be performed, in other words, only decoding of encoded data of an object sound source having a degree of priority 1 can be performed. Further, for example, "0010" shows that decoding can be performed to a degree of priority 2, in other words, encoded data of an object sound source having a degree of priority 1 or 2 can be decoded. The same applies hereinafter.

For example, on the reception side, the decoding ability information is recorded as a piece of the EDID. The CPU 104 reads the EDID via the DDC channel, thereby acquiring the decoding ability information of the reception side. Further, for example, the CPU 104 communicates with the reception side through the CEC line, thereby acquiring the decoding ability information of the reception side.

Further, in the present embodiment, the CPU 104 acquires information (partially decoded stream compatibility information) indicating whether or not the reception side is compatible with a partially decoded audio stream from the reception side via the digital interface of the HDMI. In a case where the reception side is not compatible with the partially decoded audio stream, under control of the CPU 104, the audio decoder 127 may not output an encoded audio stream including encoded data of an object sound source having less than a predetermined degree of priority at which decoding can be performed by the own side.

For example, on the reception side, the partially decoded stream compatibility information is recorded as a piece of the EDID. The CPU 104 reads the EDID via the DDC channel, thereby acquiring the partially decoded stream compatibility information of the reception side. Further, for example, the CPU 104 communicates with the reception side through the CEC line, thereby acquiring the partially decoded stream compatibility information of the reception side.

FIG. 4 shows a configuration example of the audio decoder 127. The audio decoder 127 includes a degree-of-priority analysis unit 127*a* and a decoding unit 127*b*. The degree-of-priority analysis unit 127*a* analyzes degrees of priority of pieces of encoded data of a plurality of object sound sources included in an input encoded audio stream.

Then, the degree-of-priority analysis unit 127*a* supplies a piece of decodable encoded data of an object sound source having a predetermined or more degree of priority to the decoding unit 127*b*. The decoding unit 127*b* performs decoding processing with respect to the piece of the encoded data of the object sound source having the predetermined or more degree of priority, thereby obtaining uncompressed audio data having a predetermined number of channels, and generates and outputs a decoded audio stream including this uncompressed audio data having the predetermined number of channels. Further, regarding encoded data of an object sound source having less than the predetermined degree of priority, the degree-of-priority analysis unit 127*a* generates and outputs an encoded audio stream including the encoded data.

Referring back to FIG. 2, the audio output terminal 129 outputs the uncompressed audio data having the predetermined number of channels obtained in the audio decoder 127. Note that the number of channels of the uncompressed audio data to be output to the audio output terminal 129 may be different from the number of channels of the uncompressed audio data included in the decoded audio stream. For example, the number of channels of the uncompressed audio data included in the decoded audio stream is "6" for 5.1 channel, whereas the number of channels of the uncompressed audio data to be output to the audio output terminal 129 is "2" for a stereo.

The HDMI transmission unit 102 transmits the uncompressed image data obtained in the video decoder 122 and the partially decoded audio stream (decoded audio stream and encoded audio stream) or the decoded audio stream output from the audio decoder 127 via the HDMI terminal 101 via communication conforming to the HDMI. The HDMI transmission unit 102 packs the image data and the audio stream and outputs the image data and the audio stream to the HDMI terminal 101 in order to perform transmission via a TMDS channel of the HDMI. Detailed description of this HDMI transmission unit 102 will be provided below.

The HDMI transmission unit 102 causes an InfoFrame packet inserted into a blanking period of TMDS transmission data (see FIG. 11 below), for example, an audio InfoFrame packet to have information indicating a type of an audio stream to be transmitted. With this information, on the reception side, it is possible to easily grasp the type of the received audio stream, in other words, a partially decoded audio stream or a decoded audio stream, and therefore appropriate processing can be performed.

Figure 5:
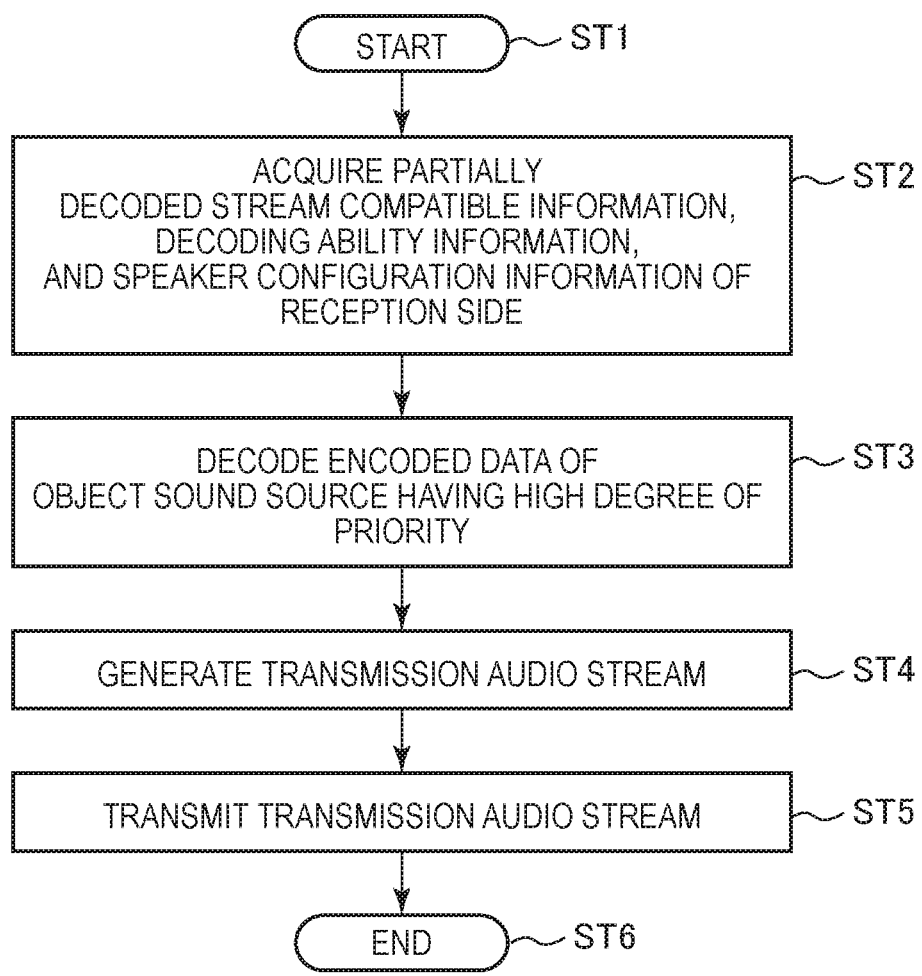
FIG. 5 is a flowchart showing an example of a processing procedure regarding transmission of an audio stream in a BD player.

A flowchart of FIG. 5 shows an example of a processing procedure regarding transmission of an audio stream in the BD player 100. The BD player 100 starts processing in Step ST1. Then, in Step ST2, the BD player 100 acquires partially decoded stream compatibility information, decoding ability information, and speaker configuration information of the reception side.

Next, in Step ST3, among pieces of encoded data of a plurality of object sound sources included in an encoded audio stream extracted in the demultiplexer 121, the BD player 100 performs decoding processing with respect to a piece of encoded data of an object sound source having a predetermined or more degree of priority at which decoding can be performed by the own side, thereby obtaining uncompressed audio data having the number of channels indicated by the speaker configuration information of the reception side.

Next, in Step ST4, the BD player 100 generates a transmission audio stream. That is, the BD player 100 generates a decoded audio stream including the uncompressed audio data having the predetermined number of channels obtained by decoding. Further, in a case where encoded data of an object sound source having less than the predetermined degree of priority exists and the reception side is compatible with a partially decoded audio stream and, in addition, the reception side has a decoding ability of this encoded data of the object sound source having less than the predetermined degree of priority, the BD player 100 further generates an encoded audio stream including this encoded data of the object sound source having less than the predetermined degree of priority.

Next, in Step ST5, the BD player 100 transmits the transmission audio stream to the reception side via the digital interface of the HDMI. In this case, the transmission audio stream is a partially decoded audio stream (decoded audio stream and encoded audio stream) or a decoded audio stream. Then, after the processing in Step ST5, the BD player 100 terminates the processing in Step ST6.

Operation of the BD player 100 shown in FIG. 2 will be briefly described. At the time of recording, content data to be recorded is acquired through a digital tuner (not shown) or the network terminal 116 via the Ethernet interface 115. This content data is input to the storage medium control interface 111 and is recorded on a BD disc by the BD drive 112, on the HDD 113, or on a semiconductor memory by the SSD 114.

At the time of reproduction, a multiplexed stream that is the content data reproduced in the BD drive 112, the HDD 113, or the SSD 114 is supplied to the demultiplexer 121 via the storage medium control interface 111. In the demultiplexer 121, an encoded video stream and an encoded audio stream are extracted from the multiplexed stream.

The encoded video stream extracted in the demultiplexer 121 is supplied to the video decoder 122. In the video decoder 122, the encoded video stream is subjected to decoding processing, and therefore uncompressed image data is obtained. This image data is subjected to superimposition processing of graphics data and the like in the graphic generation circuit 123 as necessary and is then output to the video output terminal 124. Further, the image data is supplied from the graphic generation circuit 123 to the panel drive circuit 125 and a reproduction image is displayed on the display panel 126 in accordance with user operation.

Further, the encoded audio stream extracted in the demultiplexer 121 is supplied to the audio decoder 127. This encoded audio stream is an encoded audio stream of object-based audio including encoded data of a plurality of object sound sources having degree-of-priority information.

In the audio decoder 127, among pieces of encoded data of a plurality of object sound sources included in the encoded audio stream extracted in the demultiplexer 121, decoding processing is performed with respect to a piece of encoded data of an object sound source having a predetermined or more degree of priority at which decoding can be performed by the audio decoder 127, and therefore uncompressed audio data having the number of channels indicated by speaker configuration information of the reception side is obtained.

Then, in the audio decoder 127, a decoded audio stream including the uncompressed audio data having the predetermined number of channels obtained by decoding is generated. Further, in a case where encoded data of an object sound source having less than the predetermined degree of priority exists and the reception side is compatible with a partially decoded audio stream and, in addition, the reception side has a decoding ability of this encoded data of the object sound source having less than the predetermined degree of priority, an encoded audio stream including this encoded data of the object sound source having less than the predetermined degree of priority is further generated in the audio decoder 127. The uncompressed audio data having the predetermined number of channels generated in the audio decoder 127 is output to the audio output terminal 129.

Further, the audio stream generated in the audio decoder 127, i.e., a partially decoded audio stream (decoded audio stream and encoded audio stream) or the decoded audio stream, is supplied to the HDMI transmission unit 102 as a transmission audio stream. To the HDMI transmission unit 102, the uncompressed image data obtained in the video decoder 122 is also supplied to the HDMI transmission unit 102. In the HDMI transmission unit 102, the image data and the transmission audio stream are packed and are output to the HDMI terminal 101.

[Configuration Example of Audio Amplifier]

Figure 6:
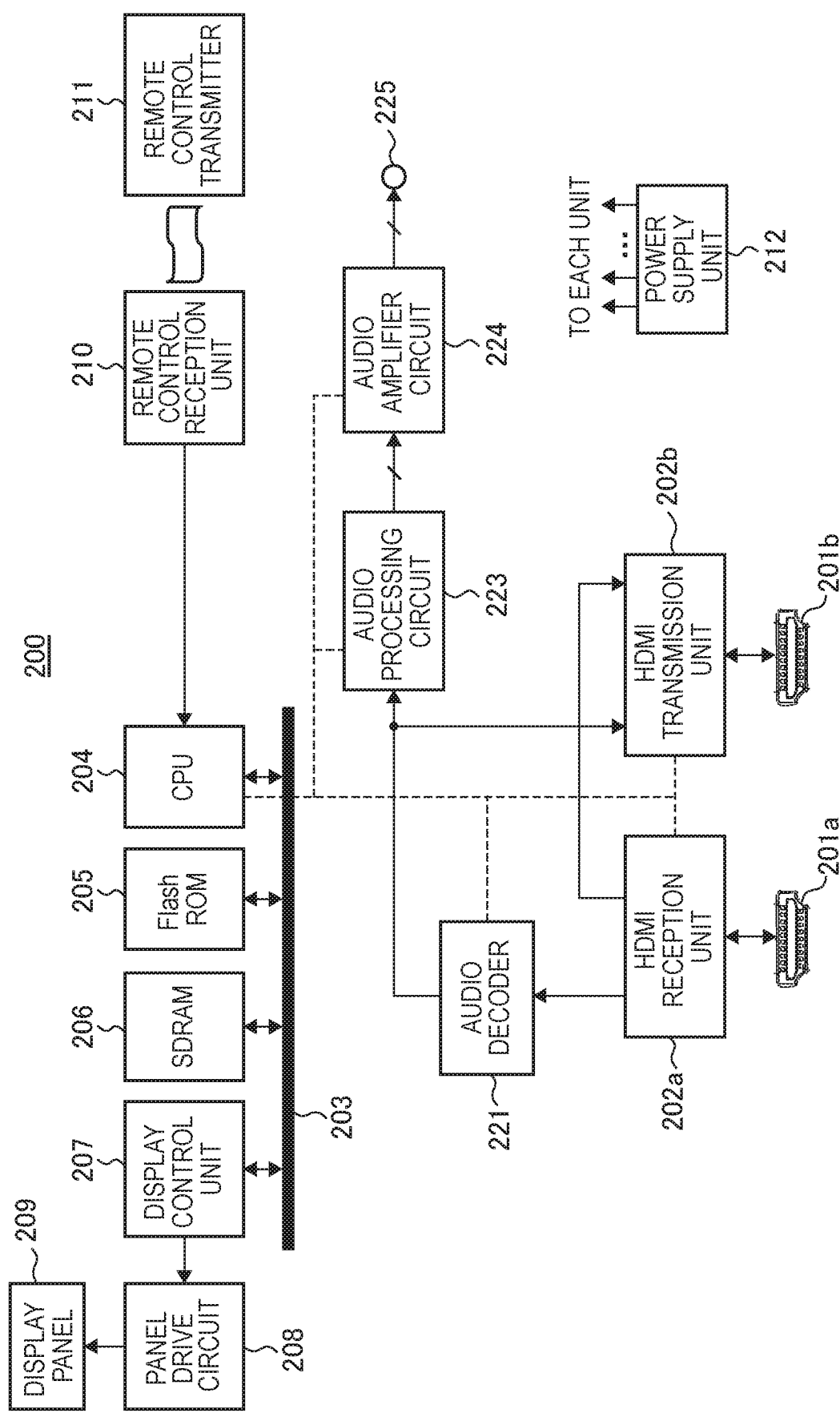
FIG. 6 is a block diagram showing a configuration example of an audio amplifier constituting an AV system.

FIG. 6 shows a configuration example of the audio amplifier 200. The audio amplifier 200 includes the HDMI terminals 201a and 201b, the HDMI reception unit 202a, and the HDMI transmission unit 202b. Further, the audio amplifier 200 includes an audio decoder 221, an audio processing circuit 223, an audio amplifier circuit 224, and an audio output terminal 225.

Further, the audio amplifier 200 includes an internal bus 203, a CPU 204, a flash ROM 205, an SDRAM 206, a display control unit 207, a panel drive circuit 208, a display panel 209, a remote control reception unit 210, a remote control transmitter 211, and a power supply unit 212. The CPU 204, the flash ROM 205, the SDRAM 206, and the display control unit 207 are connected to the internal bus 203.

The CPU 204 controls operation of each unit of the audio amplifier 200. The flash ROM 205 stores control software and stores data. The SDRAM 206 forms a work area of the CPU 204. The CPU 204 expands the software and the data read from the flash ROM 205 on the SDRAM 206 and starts the software, thereby controlling each unit of the audio amplifier 200.

The remote control reception unit 210 receives a remo control signal (remote control code) transmitted from the remote control transmitter 211 and supplies the signal to the CPU 204. The CPU 204 controls each unit of the audio amplifier 200 on the basis of this remote control code. Note that, in the present embodiment, a remote control unit is shown as a user instruction input unit. However, the user instruction input unit may be another configuration such as a switch, a wheel, a touch screen unit through which instruction input is performed by an approach/touch, a mouse, a keyboard, a gesture input unit for detecting instruction input by using a camera, or an audio input unit through which instruction input is performed by audio.

In order to, for example, display a user interface or display a status of the audio amplifier 200, the display control unit 207 controls the panel drive circuit 208, thereby controlling display on the display panel 209. The display panel 209 is configured as, for example, a liquid crystal display (LCD) or an organic electro-luminescence panel.

Note that, although there is described an example where not only the CPU 204 but also the display control unit 207 is provided in the present embodiment, display on the display panel 209 may be directly controlled by the CPU 204. Further, the CPU 204 and the display control unit 207 may be a single chip or may be a plurality of cores. The power supply unit 212 supplies power to each unit of the audio amplifier 200. This power supply unit 212 may be an AC power supply or may be a cell (storage cell, dry cell).

The HDMI reception unit 202a receives uncompressed image data and an audio stream to be supplied to the HDMI terminal 201a through the HDMI cable via communication conforming to the HDMI. The audio stream is a partially decoded audio stream (decoded audio stream and encoded audio stream) or a decoded audio stream.

Herein, the decoded audio stream includes uncompressed audio data having a predetermined number of channels which is obtained by decoding a piece of encoded data of an object sound source having a predetermined or more degree of priority at which decoding can be performed on the transmission side. Further, the encoded audio stream includes encoded data of an object sound source having less than the predetermined degree of priority.

The HDMI reception unit 202a extracts various InfoFrame packets inserted into a blanking period of TMDS transmission data and transmits the various InfoFrame packets to the CPU 204. Those InfoFrame packets also have information indicating whether the received audio stream is a partially decoded audio stream or a decoded audio stream. The CPU 204 recognizes whether the received audio stream is a partially decoded audio stream or a decoded audio stream on the basis of this information.

Note that the HDMI reception unit 202a includes an EDID read only memory (ROM) that stores EDID serving as capability information regarding capability (Configuration•Capability) of the own side. This EDID also has, for example, partially decoded stream compatibility information, decoding ability information, and speaker configuration information. The transmission side reads this EDID, and therefore the partially decoded stream compatibility information, the decoding ability information, and the speaker configuration information of the audio amplifier 200 are transmitted to the transmission side.

In a case where the audio stream received by the HDMI reception unit 202a is a partially decoded audio stream (decoded audio stream and encoded audio stream), under control of the CPU 204, among pieces of encoded data of object sound sources having degrees of priority included in the encoded audio stream, the audio decoder 221 subjects a piece of encoded data of an object sound source having a degree of priority falling within a range of a decoding ability of the audio decoder 221 to decoding processing falling within the range of the decoding ability thereof, thereby obtaining uncompressed audio data having a predetermined number of channels.

Then, the audio decoder 221 mixes (combines) the uncompressed audio data having the predetermined number of channels obtained in the decoding processing as described above and the uncompressed audio data having the predetermined number of channels included in the decoded audio stream and generates and outputs a decoded audio stream including the mixed uncompressed audio data having the predetermined number of channels.

Further, in a case where the audio stream received by the HDMI reception unit 202a is a decoded audio stream, the audio decoder 221 outputs this decoded audio stream as it is under control of the CPU 204.

Figure 7:
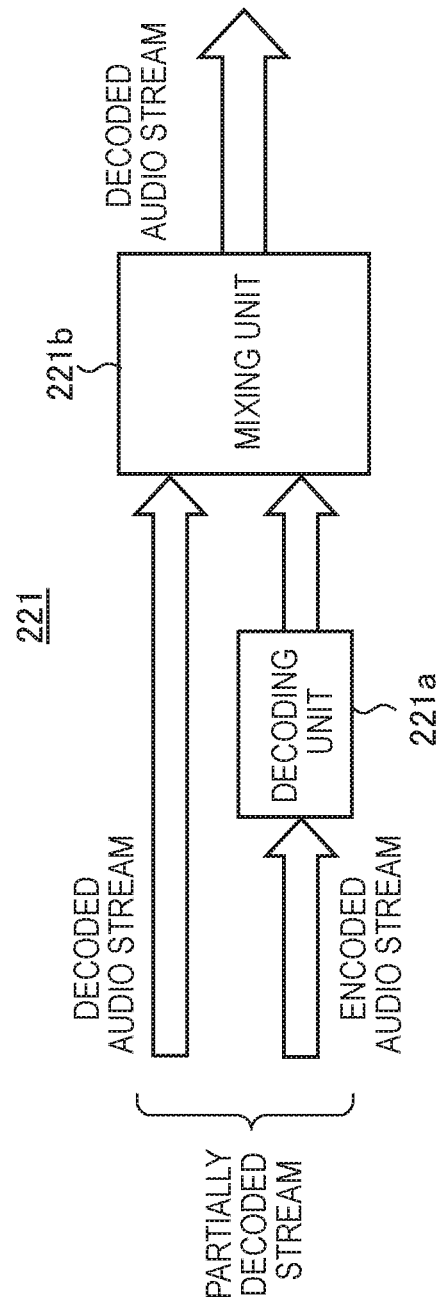
FIG. 7 is a block diagram showing a configuration example of an audio decoder in an audio amplifier.

FIG. 7 shows a configuration example of the audio decoder 221. The audio decoder 221 includes a decoding unit 221a and a mixing unit 221b. The decoding unit 221a performs decoding processing with respect to encoded data of an object sound source having a degree of priority included in an encoded audio stream, thereby obtaining uncompressed audio data having a predetermined number of channels.

The mixing unit 221b mixes (combines) the uncompressed audio data having the predetermined number of channels obtained in the decoding unit 221a and uncompressed audio data having the predetermined number of channels included in a decoded audio stream and generates and outputs a decoded audio stream including the mixed uncompressed audio data having the predetermined number of channels. Note that, in a case where only a decoded audio stream is input by the audio decoder 221, the mixing unit 221b outputs this decoded audio stream as it is.

Referring back to FIG. 6, the audio processing circuit 223 takes out the uncompressed audio data having the predetermined number of channels from the decoded audio stream output from the audio decoder 221 and performs necessary processing such as D/A conversion. The audio amplifier circuit 224 amplifies the audio signal having the predetermined number of channels obtained in the audio processing circuit 223 and outputs the audio signal to the audio output terminal 225. Note that the speaker system 400 is connected to the audio output terminal 225.

The HDMI transmission unit 202b transmits the uncompressed image data received by the HDMI reception unit 202a and the decoded audio stream output from the audio decoder 221 through the HDMI terminal 201b via communication conforming to the HDMI. In order to perform transmission via the TMDS channel of the HDMI, the HDMI transmission unit 202b packs the image data and the audio stream and outputs the image data and the audio stream to the HDMI terminal 201b. Detailed description of this HDMI transmission unit 202b will be provided below.

Figure 8:
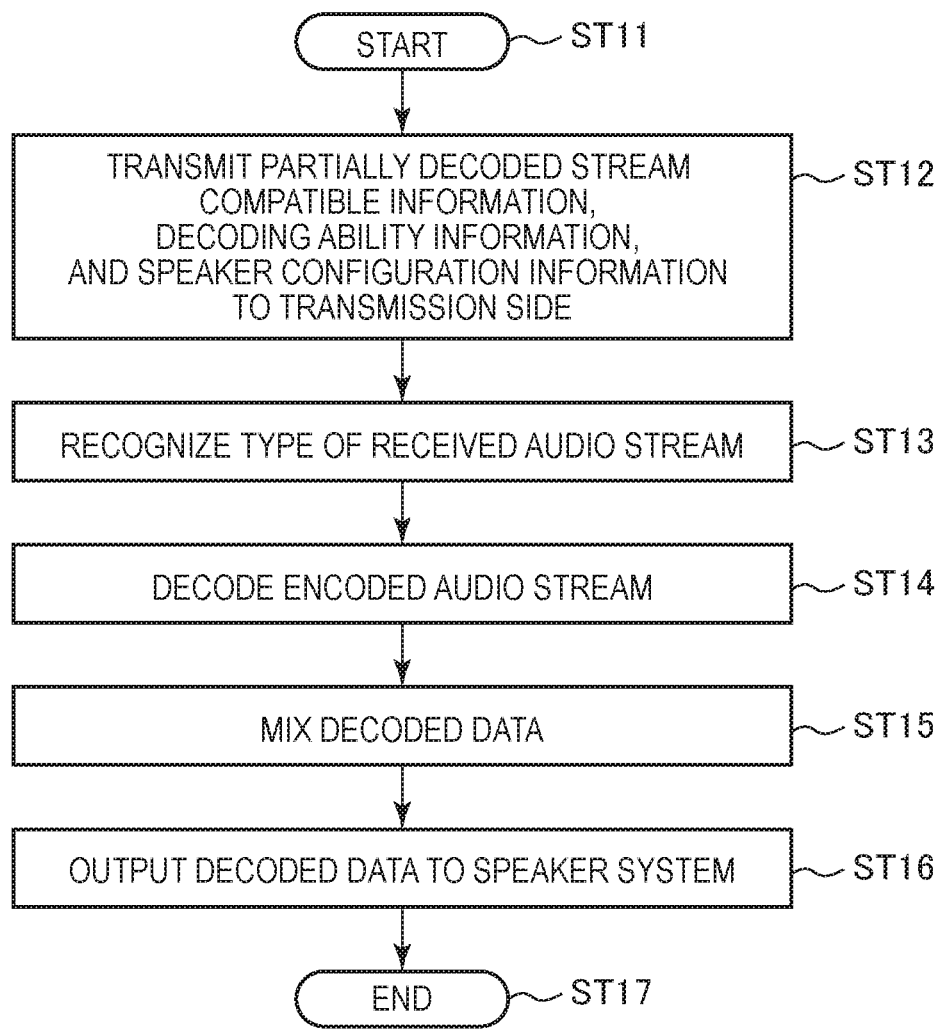
FIG. 8 is a flowchart showing an example of a processing procedure regarding audio output in an audio amplifier.

A flowchart of FIG. 8 shows an example of a processing procedure regarding audio output in the audio amplifier 200. The audio amplifier 200 starts processing in Step ST11. Then, in Step ST12, the audio amplifier 200 transmits partially decoded stream compatibility information, decoding ability information, and speaker configuration information to the transmission side. For example, transmission of this information is performed in such a manner that the transmission side reads EDID via the DDC channel. Further, for example, transmission of this information is performed by communicating with the transmission side through the CEC line.

Next, in Step ST13, the audio amplifier 200 recognizes a type of a received audio stream, in other words, a partially decoded audio stream (decoded audio stream and encoded audio stream) or a decoded audio stream. Such recognition is performed on the basis of information indicating whether the received audio stream is a partially decoded audio stream or a decoded audio stream, the information being included in a predetermined InfoFrame packet inserted into a blanking period of TMDS transmission data.

Next, in a case where the received audio stream is a partially decoded audio stream, in Step ST14, the audio amplifier 200 subjects the encoded audio stream to decoding processing, thereby obtaining uncompressed audio data having a predetermined number of channels. Then, in Step ST15, the audio amplifier 200 mixes (combines) the uncompressed audio data having the predetermined number of channels obtained in the decoding processing and uncompressed audio data having the predetermined number of channels included in the decoded audio stream, thereby obtaining uncompressed output audio data having the predetermined number of channels.

Next, in Step ST16, the audio amplifier 200 outputs the uncompressed audio data having the predetermined number of channels to the speaker system 400. In this case, in a case where the received audio stream is a partially decoded audio stream, the uncompressed audio data having the predetermined number of channels which is obtained by mixing in Step ST15 is output. Meanwhile, in a case where the received audio stream is a decoded audio stream, the uncompressed audio data having the predetermined number of channels included in the decoded audio stream is output.

After the processing in Step ST16, the audio amplifier 200 terminates the processing in Step ST17.

Operation of the audio amplifier 200 shown in FIG. 6 will be briefly described. Uncompressed image data and an audio stream, which are transmitted to the HDMI terminal 201a from the BD player 100 via the HDMI cable, are received in the HDMI reception unit 202a. The audio stream is a partially decoded audio stream (decoded audio stream and encoded audio stream) or a decoded audio stream.

The audio stream received by the HDMI reception unit 202a is supplied to the audio decoder 221. In a case where the received audio stream is a partially decoded audio stream, in the audio decoder 221, among pieces of encoded data of object sound sources having degrees of priority included in the encoded audio stream, a piece of encoded data of an object sound source having a degree of priority falling within a range of a decoding ability of the audio decoder 221 is subjected to decoding processing falling within the range of the decoding ability thereof.

Then, in the audio decoder 221, the uncompressed audio data having the predetermined number of channels obtained in the decoding processing and uncompressed audio data having the predetermined number of channels included in the decoded audio stream are mixed (combined), and a decoded audio stream including the mixed uncompressed audio data having the predetermined number of channels is generated.

Further, in the audio decoder 221, in a case where the received audio stream is a decoded audio stream, this decoded audio stream is output as it is without performing substantial decoding processing.

The decoded audio stream output from the audio decoder 221 is supplied to the audio processing circuit 223. In the audio processing circuit 223, the uncompressed audio data having the predetermined number of channels is taken out from the decoded audio stream and is subjected to necessary processing such as D/A conversion, and therefore audio signals of the predetermined number of channels are obtained. Then, when muting is in an off state, the audio signal of each channel to be output from the audio processing circuit 223 is amplified in the audio amplifier circuit 224 and is output to the audio output terminal 225. Therefore, audio of the predetermined number of channels is output from the speaker system 400 connected to the audio output terminal 225.

Further, the uncompressed image data received by the HDMI reception unit 202a and the decoded audio stream output from the audio decoder 221 are supplied to the HDMI transmission unit 202b. Note that, instead of the uncompressed image data itself received by the HDMI reception unit 202a, image data obtained by subjecting this image data to processing such as superimposition of graphics data may be supplied to the HDMI transmission unit 202b. In the HDMI transmission unit 202b, the image data and the audio stream are packed and are output to the HDMI terminal 201b.

[Configuration Example of Television Receiver]

Figure 9:
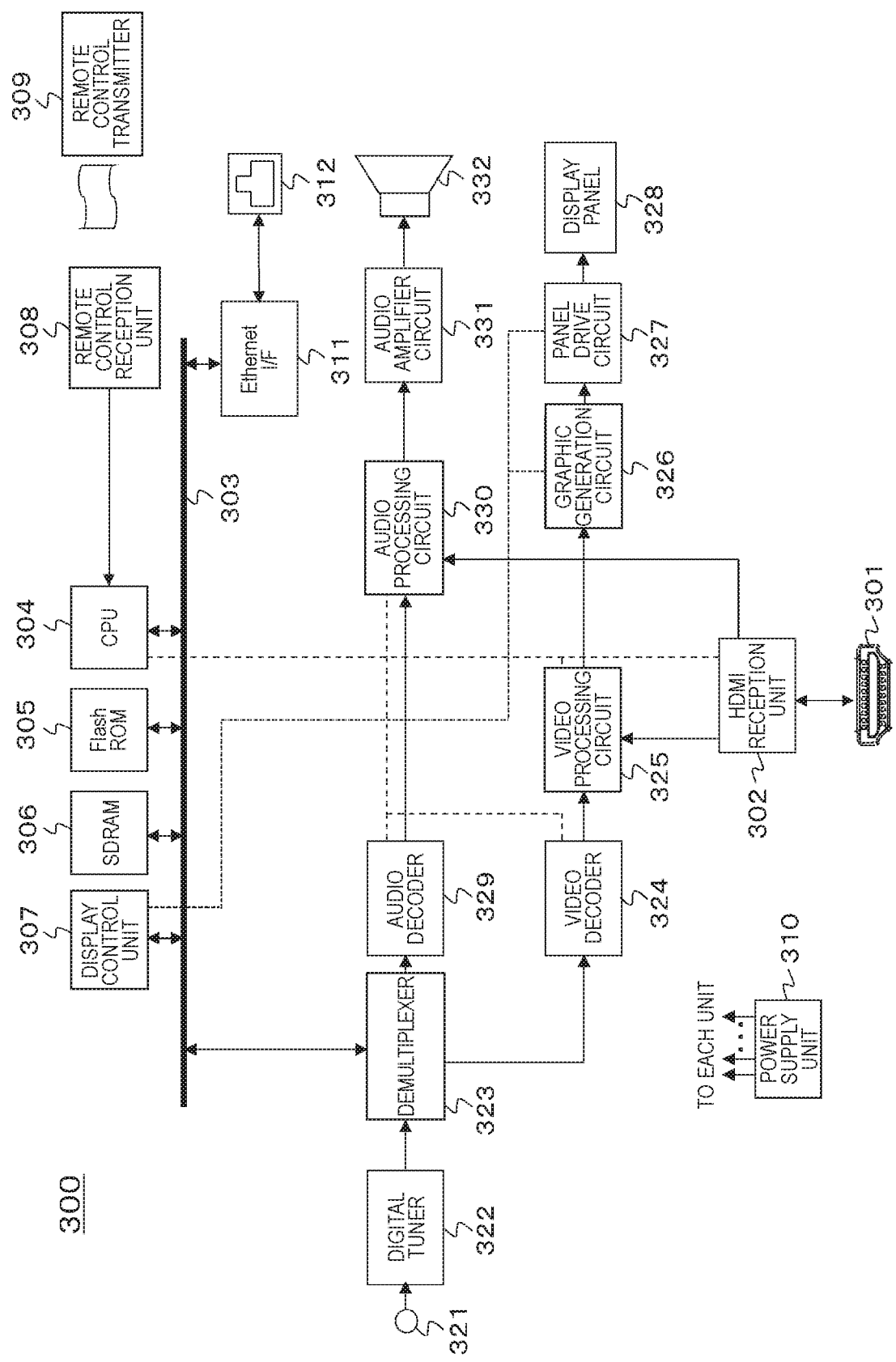
FIG. 9 is a block diagram showing a configuration example of a television receiver constituting an AV system.

FIG. 9 shows a configuration example of the television receiver 300. The television receiver 300 includes the HDMI terminal 301 and the HDMI reception unit 302. Further, the television receiver 300 includes an internal bus 303, a CPU 304, a flash ROM 305, an SDRAM (Synchronous RAM) 306, a display control unit 307, a remote control reception unit 308, a remote control transmitter 309, a power supply unit 310, an Ethernet interface (Ethernet I/F) 311, and a network terminal 312.

Further, the television receiver 300 includes an antenna terminal 321, a digital tuner 322, a demultiplexer 323, a video decoder 324, a video processing circuit 325, a graphic generation circuit 326, a panel drive circuit 327, and a display panel 328. Further, the television receiver 300 includes an audio decoder 329, an audio processing circuit 330, an audio amplifier circuit 331, and a speaker 332. The CPU 304, the flash ROM 305, the SDRAM 306, the display control unit 307, the Ethernet interface 311, and the demultiplexer 323 are connected to the internal bus 303.

The CPU 304 controls operation of each unit of the television receiver 300. The flash ROM 305 stores control software and stores data. The SDRAM 306 forms a work area of the CPU 304. The CPU 304 expands the software and the data read from the flash ROM 305 on the SDRAM 306 and starts the software, thereby controlling each unit of the television receiver 300.

The remote control reception unit 308 receives a remote control signal (remote control code) transmitted from the remote control transmitter 309 and supplies the signal to the CPU 304. The CPU 304 controls each unit of the television receiver 300 on the basis of this remote control code. Note that, in the present embodiment, a remote control unit is shown as a user instruction input unit. However, the user instruction input unit may be another configuration such as a switch, a wheel, a touch screen unit through which instruction input is performed by an approach/touch, a mouse, a keyboard, a gesture input unit for detecting instruction input by using a camera, or an audio input unit through which instruction input is performed by audio.

The power supply unit 310 supplies power to each unit of the television receiver 300. Note that the power supply unit 310 may be an AC power supply or may be a cell (storage cell, dry cell). The network terminal 312 is a terminal connected to a network and is connected to the Ethernet interface 311. The Ethernet interface 311 establishes network connection via the network terminal 312.

The HDMI reception unit 302 receives uncompressed image data and a decoded audio stream to be supplied to the HDMI terminal 301 through the HDMI cable via communication conforming to the HDMI. This decoded audio stream includes uncompressed audio data having a predetermined number of channels. Detailed description of this HDMI reception unit 302 will be provided below.

The antenna terminal 321 is a terminal through which a television broadcast signal received by a reception antenna (not shown) is input. The digital tuner 322 processes the television broadcast signal input to the antenna terminal 321, thereby obtaining a multiplexed stream that is content data compatible with a channel selected by the user.

The demultiplexer 323 extracts an encoded video stream and an encoded audio stream from the multiplexed stream obtained in the digital tuner 322. The video decoder 324 performs decoding processing with respect to the encoded video stream, thereby obtaining uncompressed image data. The video processing circuit 325 and the graphic generation circuit 326 perform scaling processing (resolution conversion processing), superimposition processing of graphics data, and the like with respect to the image data obtained in the video decoder 324 or the image data received by the HDMI reception unit 302 as necessary.

The panel drive circuit 327 drives the display panel 328 on the basis of the image data output from the graphic generation circuit 326. The display control unit 307 controls the graphics generation circuit 326 and the panel drive circuit 327, thereby controlling display on the display panel 328. The display panel 328 is configured as, for example, a liquid crystal display (LCD), a plasma display panel (PDP), or an organic electro-luminescence panel.

Note that, although there is described an example where not only the CPU 304 but also the display control unit 307 is provided in the present embodiment, display on the display panel 328 may be directly controlled by the CPU 304. Further, the CPU 304 and the display control unit 307 may be a single chip or may be a plurality of cores.

The audio decoder 329 subjects the encoded audio stream extracted in the demultiplexer 121 to decoding processing, thereby obtaining uncompressed audio data having a predetermined number of channels.

The audio processing circuit 330 subjects the uncompressed audio data having the predetermined number of channels obtained in the audio decoder 329 to necessary processing such as up/down mixing and D/A conversion in accordance with a configuration of the speaker 332, thereby obtaining audio signals of the necessary number of channels. Alternatively, the audio processing circuit 330 takes out the uncompressed audio data having the predetermined number of channels from the decoded audio stream received by the HDMI reception unit 302, performs necessary processing such as up/down mixing and D/A conversion in accordance with the configuration of the speaker 332, thereby obtaining audio signals of the necessary number of channels.

The audio amplifier circuit 331 amplifies the audio signal of each channel obtained in the audio processing circuit 330 and supplies the audio signal to the speaker 332. Note that the speaker 332 may be monaural or stereo. Further, the speaker 332 may be an earphone or headphone. Further, the speaker 332 may be compatible with a multiple channel such as 2.1 channel or 5.1 channel. Further, the speaker 332 may be connected to the television receiver 300 via a wireless network. Further, the speaker 332 may be another device.

Operation of the television receiver 300 shown in FIG. 6 will be briefly described. In the HDMI reception unit 302, uncompressed image data and a decoded audio stream, which are transmitted to the HDMI terminal 301 from the audio amplifier 200 through the HDMI cable, are received. The decoded audio stream includes uncompressed audio data having a predetermined number of channels. The uncompressed image data is supplied to the video processing circuit 325, and the decoded audio stream is supplied to the audio processing circuit 330.

Further, a television broadcast signal input to the antenna terminal 321 is supplied to the digital tuner 322. In this digital tuner 322, the television broadcast signal is processed, and therefore a multiplexed stream that is content data compatible with a channel selected by the user is obtained. This multiplexed stream is supplied to the demultiplexer 323.

In the demultiplexer 323, an encoded video stream and an encoded audio stream are extracted from the multiplexed stream. The encoded video stream is supplied to the video decoder 324. In the video decoder 324, the encoded video stream is subjected to decoding processing, and therefore uncompressed image data is obtained. This uncompressed image data is supplied to the video processing circuit 325.

In the video processing circuit 325 and the graphic generation circuit 326, scaling processing (resolution conversion processing), superimposition processing of graphics data, and the like are performed with respect to the image data obtained in the video decoder 324 or the image data received by the HDMI reception unit 302 as necessary. The image data subjected to the processing is supplied to the panel drive circuit 327, and an image compatible with the image data is displayed on the display panel 328.

Further, the encoded audio stream extracted in the demultiplexer 323 is supplied to the audio decoder 329. In the audio decoder 329, the encoded audio stream is subjected to decoding processing, and therefore uncompressed audio data having a predetermined number of channels is obtained. This uncompressed audio data having the predetermined number of channels is supplied to the audio processing circuit 330.

In the audio processing circuit 330, the uncompressed audio data having the predetermined number of channels obtained in the audio decoder 329 is subjected to necessary processing such as up/down mixing and D/A conversion in accordance with the configuration of the speaker 332, and therefore audio signals of the necessary number of channels are obtained. Alternatively, in the audio processing circuit 330, the uncompressed audio data having the predetermined number of channels is taken out from the decoded audio stream received by the HDMI reception unit 302, and then necessary processing such as up/down mixing and D/A conversion is performed in accordance with the configuration of the speaker 332, and therefore audio signals of the necessary number of channels are obtained.

The audio signals having the predetermined number of channels obtained in the audio processing circuit 330 are amplified in the audio amplifier circuit 331 and are then supplied to the speaker 332. Therefore, monaural, stereo, or multiple-channel audio, which is compatible with display of an image on the display panel 328, is output from the speaker 332.

"Configuration Example of HDMI Transmission Unit/Reception Unit"

FIG. 10 shows a configuration example of the HDMI transmission unit 102 of the BD player 100 and the HDMI reception unit 202a of the audio amplifier 200 in the AV system 10 of FIG. 1. Note that a configuration example of the HDMI transmission unit 202b of the audio amplifier 200 and the HDMI reception unit 302 of the television receiver 300 is a similar configuration, and therefore description thereof will be omitted.

In an effective image period 21, which is a period in which a horizontal blanking period 22 and a vertical blanking period 23 are excluded from a period between a single vertical synchronization signal and the next vertical synchronization signal (hereinafter, also referred to as "active video period" as appropriate) (see FIG. 11), the HDMI transmission unit 102 transmits differential signals corresponding to pixel data of an uncompressed image corresponding to one screen to the HDMI reception unit 202a via a plurality of channels in one direction. Further, in the horizontal blanking period 22 or the vertical blanking period 23, the HDMI transmission unit 102 transmits at least differential signals corresponding to audio data associated with the image, control data, other auxiliary data, and the like to the HDMI reception unit 202a via the plurality of channels in one direction.

That is, the HDMI transmission unit 102 includes an HDMI transmitter 31. The transmitter 31 converts, for example, pixel data of an uncompressed image into differential signals corresponding thereto and serially transmits the differential signals to the HDMI reception unit 202a via three transition minimized differential signaling (TMDS) channels #0, #1, and #2 which are the plurality of channels in one direction.

Further, the transmitter 31 converts audio data associated with the uncompressed image, and, in addition, necessary control data, other auxiliary data, and the like into differential signals corresponding thereto and serially transmits the differential signals to the HDMI reception unit 202a via the three TMDS channels #0, #1, and #2 in one direction.

The HDMI reception unit 202a receives the differential signals corresponding to the pixel data, the differential signals being transmitted from the HDMI transmission unit 102 via the plurality of channels in one direction, in the active video period 21 (see FIG. 11). Further, the HDMI reception unit 202a receives the differential signals corresponding to the audio data and the control data, the differential signals being transmitted from the HDMI transmission unit 102 via the plurality of channel in one direction, in the horizontal blanking period 22 (see FIG. 11) or the vertical blanking period 23 (see FIG. 11).

Transmission channels in an HDMI system made up of the HDMI transmission unit 102 and the HDMI reception unit 202a are not only the three TMDS channels #0 to #2 serving as transmission channels for transmitting pixel data and audio data and a TMDS clock channel serving as a transmission channel for transmitting a pixel clock, but also transmission channels referred to as a display data channel (DDC) 33 and a consumer electronics control (CEC) line 34.

The DDC 33 is made up of two signal lines included in the HDMI cable 510 and is used in order that the HDMI transmission unit 102 reads extended display identification data (EDID) from the HDMI reception unit 202a connected through the HDMI cable 510. That is, the HDMI reception unit 202a includes not only an HDMI receiver 32 but also an EDID read only memory (ROM) that stores EDID serving as capability information regarding capability (Configuration•Capability) of the own side.

In the audio amplifier 200, partially decoded stream compatibility information, decoding ability information, and speaker configuration information are recorded as a piece of this EDID. The HDMI transmission unit 102 reads the EDID, and therefore the partially decoded stream compatibility information, the decoding ability information, and the speaker configuration information of the reception side are transmitted to the transmission side.

The HDMI transmission unit 102 reads the EDID from the HDMI reception unit 202a connected through the HDMI cable 510 via the DDC 33. Then, the CPU 104 of the BD player 100 recognizes a capability of the audio amplifier 200 including the HDMI reception unit 202a on the basis of the EDID.

The CEC line 34 is made up of a single signal line included in the HDMI cable 510 and is used to perform bidirectional communication of control data between the HDMI transmission unit 102 and the HDMI reception unit 202a. Further, the HDMI cable 510 includes an HPD line 35 connected to a pin referred to as "hot plug detect (HPD)".

The source device can detect connection of the sink device by using this HPD line 35 with a DC bias potential. In this case, the HPD line 35 has a function of receiving a notification of a connection state from the sink device with a DC bias potential, which is seen from the source device side. On the contrary, this HPD line has a function of transmitting a notification of a connection state to the source device with a DC bias potential, which is seen from the sink device side.

Further, the HDMI cable 510 includes a power supply line 36 used to supply power from the source device to the sink device. The HDMI cable 510 further includes a reserve line 37. The HPD line 35 and the reserve line 37 are used to constitute a pair of differential transmission paths and are also used as a bidirectional communication channel.

FIG. 11 is a view showing periods of various pieces of transmission data in a case where image data having width× height of 1920 pixels×1080 lines is transmitted via the TMDS channels. In a video field in which transmission data is transmitted via the three TMDS channels of the HDMI, three types of periods, i.e., a video data period 24, a data island period 25, and a control period 26 exist in accordance with a type of transmission data.

Herein, the video field period is a period between an active edge of a certain vertical synchronization signal and an active edge of the next vertical synchronization signal and is divided into parts, i.e., the horizontal blanking period 22 (Horizontal Blanking), the vertical blanking period 23 (Vertical Blanking), and the active video period 21 (Active Video) which is a period in which the horizontal blanking period and the vertical blanking period are excluded from the video field period.

The video data period 24 is allotted to the active video period 21. In this video data period 24, data of active pixels of 1920 pixels×1080 lines forming uncompressed image data corresponding to one screen is transmitted. The data island period 25 and the control period 26 are allotted to the horizontal blanking period 22 and the vertical blanking period 23. In those data island period 25 and the control period 26, auxiliary data is transmitted.

That is, the data island period 25 is allotted to a part of the horizontal blanking period 22 and the vertical blanking period 23. In this data island period 25, for example, a packet of audio data, which is data irrelevant to control in the auxiliary data, is transmitted. The control period 26 is allotted to the other part of the horizontal blanking period 22 and the vertical blanking period 23. In this control period 26, for example, a vertical synchronization signal, a horizontal synchronization signal, and a control packet, which are data relevant to control in the auxiliary data, are transmitted.

As described above, in the AV system 10 shown in FIG. 1, the BD player 100 simultaneously transmits a decoded audio stream and an encoded audio stream as a partially decoded audio stream to the reception side, and favorable audio output can be obtained on the reception side. For example, on a reception side that does not include an audio decoder, it is possible to perform simple audio output by using the decoded audio stream, whereas, on a reception side having a high-quality audio decoder, it is possible to perform high-quality audio output by further decoding the encoded audio stream.

Further, in the AV system 10 shown in FIG. 1, in a case where the audio amplifier 200 receives a partially decoded audio stream (decoded audio stream and encoded audio stream) from the transmission side, the audio amplifier 200 mixes (combines) uncompressed audio data having a predetermined number of channels included in the decoded audio stream and uncompressed audio data having the predetermined number of channels obtained by subjecting the encoded audio stream to decoding processing, thereby obtaining output audio data. Therefore, high-quality audio output can be performed without user operation.

In this case, because the BD player 100 is caused to include the audio decoder 127 for performing simple reproduction and the audio amplifier 200 is caused to to include the audio decoder 221 for performing high-quality reproduction, it is possible to optimize both the audio decoders.

2. Modification Example

Note that, in the above embodiment, there has been described an example where an encoded stream including a plurality of pieces of encoded data having degree-of-priority information is an encoded audio stream of object-based audio. It is needless to say that the present technology is also applicable to a case where an encoded video stream including a plurality of encoded video data having degree-of-priority information is treated. Also in this case, decoding processing is divided between the transmission side and the reception side, and therefore it is possible to provide the highest-quality reproduction.

Further, in the above embodiment, an example of the digital interface of the HDMI has been described. However, the digital interface is not limited to the HDMI.

Additionally, the present technology may also be configured as below.

(1)

A transmission apparatus including:

a stream acquisition unit configured to acquire an encoded stream including a plurality of pieces of encoded data having degree-of-priority information;

a decoding unit configured to, among the plurality of pieces of encoded data, perform decoding processing with respect to a piece of encoded data having a predetermined or more degree of priority and generate a decoded stream including decoded data and, among the plurality of pieces of encoded data, generate an encoded stream including a piece of encoded data having less than the predetermined degree of priority; and a stream transmission unit configured to simultaneously transmit the decoded stream and the encoded stream generated in the decoding unit as a partially decoded stream to a reception side via a digital interface.

(2)

The transmission apparatus according to (1), further including:

a determination unit configured to determine whether or not the reception side is compatible with the partially decoded stream, in which, in a case where the determination unit determines that the reception side is compatible with the partially decoded stream, the transmission unit transmits the partially decoded stream to the reception side.

(3)

The transmission apparatus according to (2), in which the determination unit determines that the reception side is compatible with the partially decoded stream on the basis of information indicating that the reception side is compatible with the partially decoded stream, the information being acquired from the reception side.

(4)

The transmission apparatus according to any one of (1) to (3), further including an information transmission unit configured to transmit information indicating transmission of the partially decoded stream to the reception side via the digital interface.

(5)

The transmission apparatus according to any one of (1) to (4), in which the encoded stream is an encoded audio stream of an object-based audio including encoded data of a plurality of object sound sources having degree-of-priority information, and among pieces of the encoded data of the plurality of object sound sources, the decoding unit performs decoding processing with respect to a piece of encoded data of an object sound source having a predetermined or more degree of priority and generates a decoded audio stream including audio data having a predetermined number of channels and, among the pieces of encoded data of the plurality of object sound sources, generates an encoded audio stream including a piece of encoded data of an object sound source having less than the predetermined degree of priority.

(6)

The transmission apparatus according to (5), further including an information acquisition unit configured to acquire speaker configuration information from the reception side via the digital interface, in which the decoding unit generates a decoded audio stream including audio data having the number of channels indicated by the speaker configuration information.

(7)

The transmission apparatus according to any one of (1) to (6), in which the digital interface is an HDMI.

(8)

A transmission method including:

a stream acquisition step of acquiring an encoded stream including a plurality of pieces of encoded data having degree-of-priority information;

a decoding step of, among the plurality of pieces of encoded data, performing decoding processing with respect to a piece of encoded data having a predetermined or more degree of priority and generating a decoded stream including decoded data and, among the plurality of pieces of encoded data, generating an encoded stream including a piece of encoded data having less than the predetermined degree of priority; and a stream transmission step of causing a stream transmission unit to simultaneously transmit the decoded stream and the encoded stream generated in the decoding unit as a partially decoded stream via a digital interface.

(9)

A reception apparatus including:

a stream reception unit configured to receive a partially decoded stream made up of a decoded stream including decoded data and an encoded stream including a predetermined number of pieces of encoded data having degree-of-priority information from a transmission side via a digital interface;

a decoding unit configured to obtain decoded data by subjecting the encoded stream to decoding processing; and a combination unit configured to obtain output data by combining the decoded data obtained in the decoding unit and the decoded data included in the decoded stream.

(10)

The reception apparatus according to (9), further including an information transmission unit configured to transmit information indicating that the reception apparatus is compatible with the partially decoded stream to the transmission side via the digital interface.

(11)

The reception apparatus according to (9) or (10), further including an information reception unit configured to receive information indicating transmission of the partially decoded stream from the transmission side via the digital interface.

(12)

The reception apparatus according to any one of (9) to (11), in which the encoded stream is an encoded audio stream of an object-based audio including encoded data of a plurality of object sound sources having degree-of-priority information.

(13)

The reception apparatus according to any one of (9) to (12), in which the digital interface is an HDMI.

(14)

A reception method including:

a stream reception step of causing a reception unit to receive a partially decoded stream made up of a decoded stream including decoded data and an encoded stream including a predetermined number of pieces of encoded data having degree-of-priority information from a transmission side via a digital interface;

a decoding step of obtaining decoded data by subjecting the encoded stream to decoding processing; and a combination step of obtaining output data by combining the decoded data obtained in the decoding step and the decoded data included in the decoded stream.

REFERENCE SIGNS LIST

10 AV system
100 BD player
101 HDMI terminal
102 HDMI transmission unit
103 internal bus
104 CPU
105 flash ROM
106 SDRAM
107 display control unit
108 remote control reception unit
109 remote control transmitter
111 storage medium control interface
112 BD drive
113 HDD
114 SSD
115 Ethernet interface
116 network terminal
121 demultiplexer
122 video decoder
123 graphic generation circuit
124 video output terminal
125 panel drive circuit
126 display panel
127 audio decoder
129 audio output terminal
131 power supply unit
200 audio amplifier
201a, 201b HDMI terminal
202a HDMI reception unit
202b HDMI transmission unit
203 internal bus
204 CPU
205 flash ROM
206 SDRAM
207 display control unit
208 panel drive circuit
209 display panel
210 remote control reception unit
211 remote control transmitter
212 power supply unit
221 audio decoder
223 audio processing circuit
224 audio amplifier circuit
225 audio output terminal
300 television receiver
301 HDMI terminal
302 HDMI reception unit
303 internal bus
304 CPU
305 flash ROM
306 SDRAM
307 display control unit
308 remote control reception unit
309 remote control transmitter
310 power supply unit
311 Ethernet interface
312 network terminal
321 antenna terminal
322 digital tuner
323 demultiplexer
324 video decoder
325 video processing circuit
326 graphic generation circuit
327 panel drive circuit
328 display panel
329 audio decoder
330 audio processing circuit
331 audio amplifier circuit
332 speaker
400 speaker system
510, 520 HDMI cable

The invention claimed is:

1. A transmission apparatus, comprising:
circuitry configured to:
acquire a first encoded stream including a plurality of pieces of encoded data, wherein each piece of encoded data of the plurality of pieces of encoded data includes degree-of-priority information;
acquire, from a reception apparatus, information related to a decode ability of the reception apparatus, wherein the information related to the decode ability of the reception apparatus indicates the degree-of-priority information decodable by the reception apparatus;
decode a first piece of encoded data of the plurality of pieces of encoded data based on the degree-of-priority information of each piece of encoded data of the plurality of pieces of encoded data, wherein the first piece of encoded data has a first degree of priority;
generate a decoded stream including decoded data based on the decode of the first piece of encoded data;

generate a second encoded stream including a second piece of encoded data of the plurality of pieces of encoded data, wherein
the second piece of encoded data has a second degree of priority, and
the second degree of priority is less than the first degree of priority;
determine, based on the information related to the decode ability of the reception apparatus, the decode ability of the reception apparatus one of exceeds or does not exceed a decode ability of the transmission apparatus for the second encoded stream;
simultaneously transmit the decoded stream and the second encoded stream as a partially decoded stream to the reception apparatus via a digital interface based on the determination that the decode ability of the reception apparatus exceeds the decode ability of the transmission apparatus; and
restrict the transmission of the second encoded stream to the reception apparatus via the digital interface based on the determination that the decode ability of the reception apparatus does not exceed the decode ability of the transmission apparatus.

2. The transmission apparatus according to claim 1, wherein the circuitry is further configured to:
determine the reception apparatus is compatible with the partially decoded stream; and
transmit the partially decoded stream to the reception apparatus based on the determination that the reception apparatus is compatible with the partially decoded stream.

3. The transmission apparatus according to claim 2, wherein the circuitry is further configured to:
acquire, from the reception apparatus, information indicating the reception apparatus is compatible with the partially decoded stream; and
determine, based on the acquired information indicating the reception apparatus is compatible with the partially decoded stream, the reception apparatus is compatible with the partially decoded stream.

4. The transmission apparatus according to claim 1, wherein
the circuitry is further configured to transmit information indicating the transmission of the partially decoded stream to the reception apparatus, and
the information indicating the transmission of the partially decoded stream is transmitted based on the determination that the decode ability of the reception apparatus exceeds the decode ability of the transmission apparatus.

5. The transmission apparatus according to claim 1, wherein
the first encoded stream is a first encoded audio stream of an object-based audio,
the plurality of pieces of encoded data corresponds to a plurality of object sound sources, and
the circuitry is further configured to:
decode a third piece of encoded data of the plurality of pieces of encoded data corresponding to a first object sound source of the plurality of object sound sources, wherein the third piece of encoded data has a third degree of priority;
generate a decoded audio stream including audio data based on the decode of the third piece of encoded data,
wherein the audio data has a specific number of channels; and
generate a second encoded audio stream including a fourth piece of encoded data of the plurality of pieces of encoded data, wherein
the fourth piece of encoded data corresponds to a second object sound source of the plurality of object sound sources,
the fourth piece of encoded data has a fourth degree of priority, and
the fourth degree of priority is less than the third degree of priority.

6. The transmission apparatus according to claim 5, wherein the circuitry is further configured to:
acquire speaker configuration information from the reception apparatus via the digital interface, wherein the speaker configuration information indicates the specific number of channels; and
generate, based on the speaker configuration information, the decoded audio stream including the audio data having the specific number of channels.

7. The transmission apparatus according to claim 1, wherein the digital interface is an HDMI.

8. A transmission method, comprising:
acquiring a first encoded stream including a plurality of pieces of encoded data, wherein each piece of encoded data of the plurality of pieces of encoded data includes degree-of-priority information;
acquiring, from a reception apparatus, information related to a decode ability of the reception apparatus, wherein the information related to the decode ability of the reception apparatus indicates the degree-of-priority information decodable by the reception apparatus;
decoding a first piece of encoded data of the plurality of pieces of encoded data based on the degree-of-priority information of each piece of encoded data of the plurality of pieces of encoded data, wherein the first piece of encoded data has a first degree of priority;
generating a decoded stream including decoded data based on the decode of the first piece of encoded data;
generating a second encoded stream including a second piece of encoded data of the plurality of pieces of encoded data, wherein
the second piece of encoded data has a second degree of priority, and
the second degree of priority is less than the first degree of priority;
determining, based on the information related to the decode ability of the reception apparatus, the decode ability of the reception apparatus one of exceeds or does not exceed a decode ability of a transmission apparatus for the second encoded stream;
simultaneously transmitting the decoded stream and the second encoded stream as a partially decoded stream via a digital interface based on the determination that the decode ability of the reception apparatus exceeds the decode ability of the transmission apparatus; and
restricting the transmission of the second encoded stream to the reception apparatus via the digital interface based on the determination that the decode ability of the reception apparatus does not exceed the decode ability of the transmission apparatus.

* * * * *